United States Patent
Yoon et al.

(10) Patent No.: US 9,281,121 B2
(45) Date of Patent: Mar. 8, 2016

(54) MULTILAYER CERAMIC ELECTRONIC COMPONENT AND MANUFACTURING METHOD THEREOF

(71) Applicant: SAMSUNG ELECTRO-MECHANICS CO., LTD., Suwon, Gyunggi-do (KR)

(72) Inventors: Byung Kwon Yoon, Gyunggi-do (KR); Min Gon Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 317 days.

(21) Appl. No.: 13/909,859

(22) Filed: Jun. 4, 2013

(65) Prior Publication Data

US 2014/0285946 A1   Sep. 25, 2014

(30) Foreign Application Priority Data

Mar. 19, 2013  (KR) .................. 10-2013-0029355

(51) Int. Cl.
*H01G 4/005* (2006.01)
*H01G 4/008* (2006.01)
*H01G 4/30* (2006.01)
*H01G 4/012* (2006.01)

(52) U.S. Cl.
CPC ............. *H01G 4/008* (2013.01); *H01G 4/0085* (2013.01); *H01G 4/30* (2013.01); *H01G 4/012* (2013.01); *Y10T 29/417* (2015.01)

(58) Field of Classification Search
CPC .............................. H01G 4/008; H01G 4/0085
USPC .......................................................... 361/303
See application file for complete search history.

(56) References Cited

U.S. PATENT DOCUMENTS

| | | | |
|---|---|---|---|
| 6,366,444 B1* | 4/2002 | Yagi | 361/321.2 |
| 7,505,248 B2* | 3/2009 | Mehr et al. | 361/308.1 |
| 8,879,235 B2* | 11/2014 | Ahn et al. | 361/301.4 |
| 2006/0023398 A1 | 2/2006 | Iwanaga | |
| 2006/0198078 A1* | 9/2006 | Miyauchi et al. | 361/305 |
| 2007/0076347 A1* | 4/2007 | Togashi et al. | 361/303 |
| 2011/0149471 A1* | 6/2011 | Hur et al. | 361/321.2 |
| 2013/0194715 A1* | 8/2013 | Kim et al. | 361/301.4 |
| 2014/0126111 A1* | 5/2014 | Kim et al. | 361/321.2 |

FOREIGN PATENT DOCUMENTS

| | | |
|---|---|---|
| JP | 2006-041392 A | 2/2006 |
| KR | 2011-0047481 A | 5/2011 |

* cited by examiner

*Primary Examiner* — Eric Thomas
(74) *Attorney, Agent, or Firm* — McDermott Will & Emery LLP

(57) ABSTRACT

There are provided a multilayer ceramic electronic component and a manufacturing method thereof, such that a high capacitance multilayer ceramic electronic component having excellent reliability through the suppression of crack generation due to a step portion and an increase in an overlapped area may be provided.

6 Claims, 5 Drawing Sheets

MULTILAYER CERAMIC ELECTRONIC COMPONENT AND MANUFACTURING METHOD THEREOF

CROSS-REFERENCE TO RELATED APPLICATIONS

This application claims the priority of Korean Patent Application No. 10-2013-0029355 filed on Mar. 19, 2013, in the Korean Intellectual Property Office, the disclosure of which is incorporated herein by reference.

BACKGROUND OF THE INVENTION

1. Field of the Invention

The present invention relates to a high capacitance multilayer ceramic electronic component having excellent reliability through the suppression of crack generation due to a step portion and an increase in an overlapped area.

2. Description of the Related Art

In accordance with the recent trend for the miniaturization of electronic products, demand for small multilayer ceramic electronic components having high capacitance has increased.

Therefore, a dielectric layer and an internal electrode included in multilayer ceramic electronic components have been thinned and stacked in increasing amounts through various methods. Recently, as a thickness of dielectric layers has been reduced, multilayer ceramic electronic components having an increased number of stacked layers have been manufactured.

Meanwhile, in internal electrodes of multilayer ceramic capacitors, margin parts, a non-overlapped area, are partially formed in a length direction thereof in order to prevent short-circuits, and respective internal electrodes are stacked in opposite directions such that the margin parts formed in the length direction are not overlapped with each other.

In this case, a portion of the multilayer ceramic capacitor forming capacitance is a region in which the internal electrodes are overlapped with each other, and margin parts formed in the length direction may be portions which do not contribute to capacitance formation.

The margin parts formed in the length direction as described above do not contribute to capacitance formation, and form step portions with internal electrodes, which may induce crack generation, causing deteriorated reliability of the multilayer ceramic capacitor.

As multilayer ceramic capacitors have been miniaturized and had high capacitance implemented therein as described above, amounts of stacked layers included therein have increased. In this case, the amount of step portions may be further increased, and the reliability of the multilayer ceramic capacitor may be further deteriorated.

Therefore, research into high capacitance multilayer ceramic electronic components in which crack generation due to the step portions is suppressed to allow for excellent reliability has remained in demand.

Related Art Document (Patent Document 1) Korean Patent Laid-Open Publication No. 2011-0047481

SUMMARY OF THE INVENTION

An aspect of the present invention provides a high capacitance multilayer ceramic electronic component having excellent reliability through the suppression of crack generation due to a step portion and an increase in an overlapped area.

According to an aspect of the present invention, there is provided a multilayer ceramic electronic component including: a ceramic body including a dielectric layer; first and second internal electrodes disposed in the ceramic body to face each other, having the dielectric layer interposed therebetween; and first and second external electrodes formed on external surfaces of the ceramic body and electrically connected to the first and second internal electrodes, wherein the first and second internal electrodes are exposed to both end surfaces of the ceramic body, the first internal electrode includes a first oxide layer formed inwardly from one end surface of the ceramic body in a length direction and a first interlayer formed adjacently to the first oxide layer and containing a metal having an ionization tendency higher than that of a metal contained in the first internal electrode or containing a metal more easily oxidized than the metal contained in the first internal electrode, in a solid solution form, as well as the metal contained in the first internal electrode, and the second internal electrode includes a second oxide layer formed inwardly from the other end surface of the ceramic body in the length direction and a second interlayer formed adjacently to the second oxide layer and containing a metal having an ionization tendency higher than that of a metal contained in the second internal electrode or containing a metal more easily oxidized than the metal contained in the second internal electrode, in a solid solution form, as well as the metal contained in the second internal electrode.

A width La of at least one of the first and second oxide layers may be 5 to 30 μm inwardly from at least one of the both end surfaces of the ceramic body in the length direction.

A width Lb from at least one of the both end surfaces of the ceramic body to at least one of the first and second interlayers may be equal to or greater than a width La of at least one of the first and second oxide layers and may be 5 μm or more.

A difference (Lc=L−Lb) between a length L of the ceramic body and a width Lb from at least one of the both end surfaces of the ceramic body to at least one of the first and second interlayers may be 5 μm or more.

The first and second interlayers may contain at least one selected from a group consisting of chromium (Cr), tungsten (W), molybdenum (Mo), magnesium (Mg), manganese (Mn), copper (Cu), and nickel (Ni).

The first and second internal electrodes may contain at least one selected from a group consisting of nickel (Ni), copper (Cu), palladium (Pd), and a palladium-silver (Pd—Ag) alloy.

According to another aspect of the present invention, there is provided a manufacturing method of a multilayer ceramic electronic component, the manufacturing method including: preparing a ceramic green sheet using a slurry containing ceramic powder; forming first and second internal electrode patterns on the ceramic green sheet using a first conductive metal paste; forming third and fourth internal electrode patterns to be adjacent to the first and second internal electrode patterns, respectively, using a second conductive metal paste containing a metal having an ionization tendency higher than that of a conductive metal contained in the first conductive metal paste or containing a metal more easily oxidized than the metal contained in the first conductive metal paste in a solid solution form, as well as the metal contained in the first conductive metal paste; stacking and cutting a plurality of layers of the ceramic green sheet to form a ceramic body including a dielectric layer and first and second internal electrodes disposed to face each other, having the dielectric layer interposed therebetween, the first internal electrode being formed such that the third internal electrode pattern is exposed to one end surface and the second internal electrode being formed such that the fourth internal electrode pattern is exposed to the other end surface; sintering the ceramic body to oxidize portions of the third and fourth internal electrode patterns; and forming first and second external electrodes on external surfaces of the ceramic body to be electrically connected to the first and second external electrodes, wherein the first and second internal electrodes are exposed to both end surfaces of the ceramic body, the first internal electrode includes a first oxide layer formed inwardly from one end surface of the ceramic body in a length direction and a first interlayer formed adjacently to the first oxide layer and containing a metal having an ionization tendency higher than that of the metal contained in the first internal electrode or containing a metal more easily oxidized than the metal contained in the first internal electrode in a solid solution form, as well as the metal contained in the first internal electrode, and the second internal electrode includes a second oxide layer formed inwardly from the other end surface of the ceramic body in the length direction and a second interlayer formed adjacently to the second oxide layer and containing a metal having an ionization tendency higher than that of the metal contained in the second internal electrode or containing a metal more easily oxidized than the metal contained in the second internal electrode in a solid solution form, as well as the metal contained in the second internal electrode.

The manufacturing method may further include forming first and second side margin parts on both side surfaces of the ceramic body, wherein the first and second side margin parts may contain a ceramic slurry, and the first and second internal electrodes may be exposed to both side surfaces of the ceramic body.

A width between the first and second internal electrodes and the both side surfaces of the ceramic body may be 18 μm or less.

A width La of at least one of the first and second oxide layers may be 5 to 30 μm inwardly from at least one of the both end surfaces of the ceramic body in the length direction.

A width Lb from at least one of the both end surfaces of the ceramic body to at least one of the first and second interlayers may be equal to or greater than a width La of at least one of the first and second oxide layers and may be 5 μm or more.

A difference (Lc=L−Lb) between a length L of the ceramic body and a width Lb from at least one of the both end surfaces of the ceramic body to at least one of the first and second interlayers may be 5 μm or more.

The metal having an ionization tendency higher than that of the conductive metal contained in the first conductive metal paste may include at least one selected from a group consisting of chromium (Cr), tungsten (W), molybdenum (Mo), magnesium (Mg), manganese (Mn), copper (Cu), and nickel (Ni).

The first conductive metal paste may contain at least one selected from a group consisting of nickel (Ni), copper (Cu), palladium (Pd), and a palladium-silver (Pd—Ag) alloy.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 1:
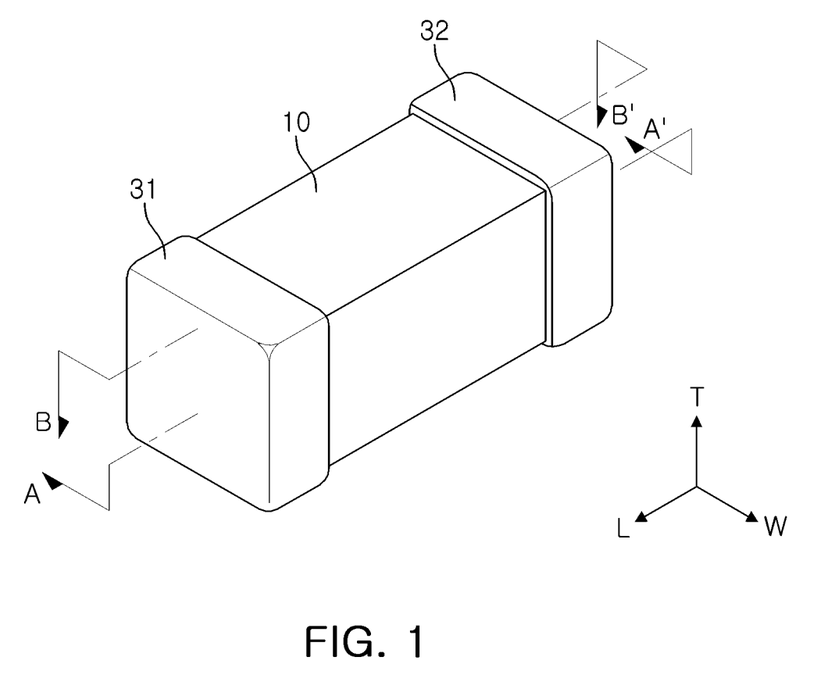
FIG. 1 is a perspective view schematically showing a multilayer ceramic capacitor according to an embodiment of the present invention.

FIG. 1 is a perspective view schematically showing a multilayer ceramic capacitor according to an embodiment of the present invention.

Figure 2:
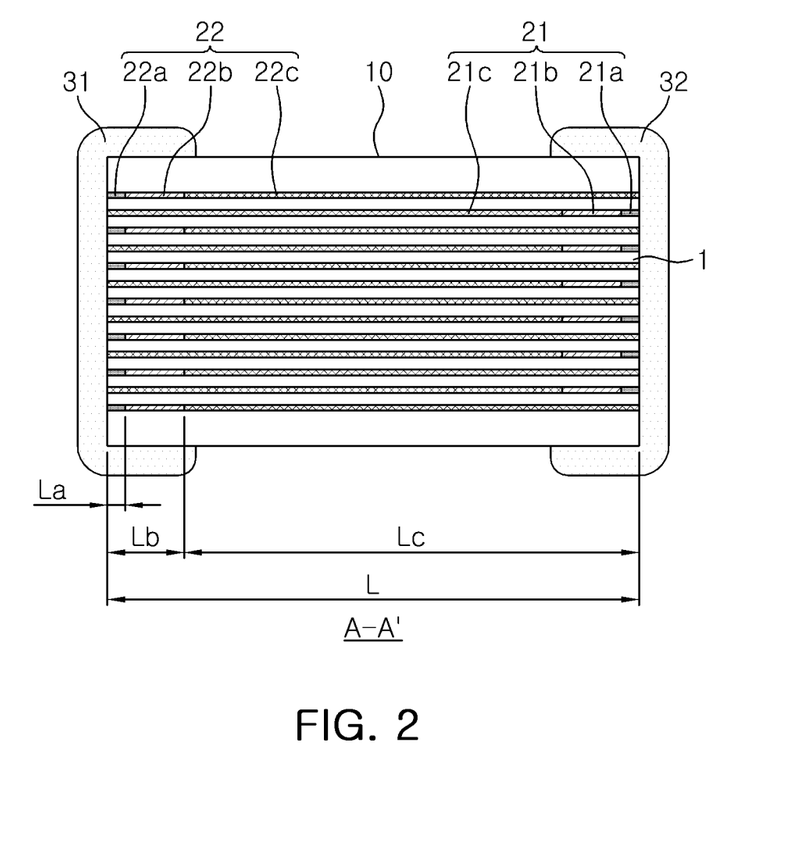
FIG. 2 is a cross-sectional view taken along line A-A' of FIG. 1.

FIG. 2 is a cross-sectional view taken along line A-A' of FIG. 1.

Figure 3:
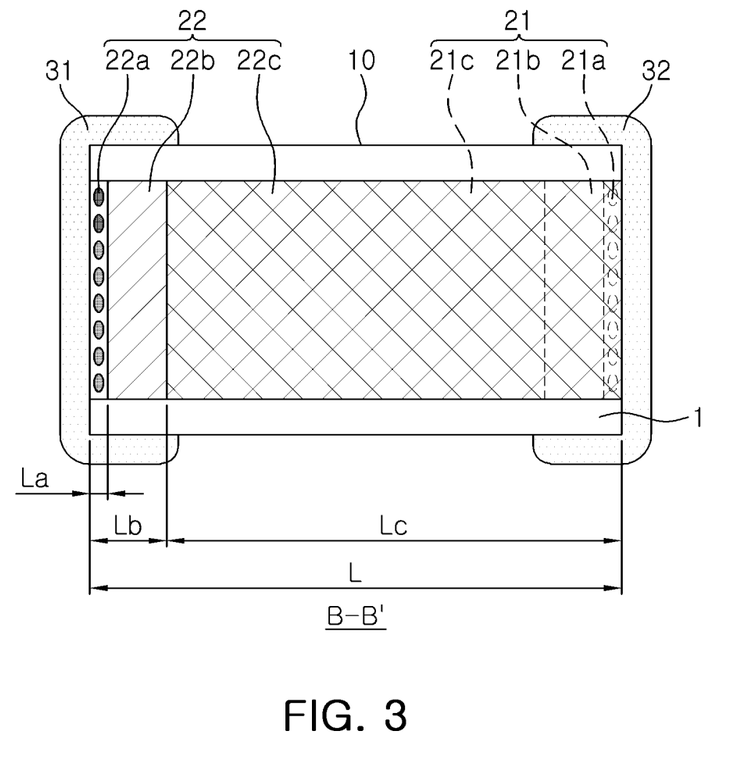
FIG. 3 is a cross-sectional view taken along line B-B' of FIG. 1.

FIG. 3 is a cross-sectional view taken along line B-B' of FIG. 1.

Figure 4:
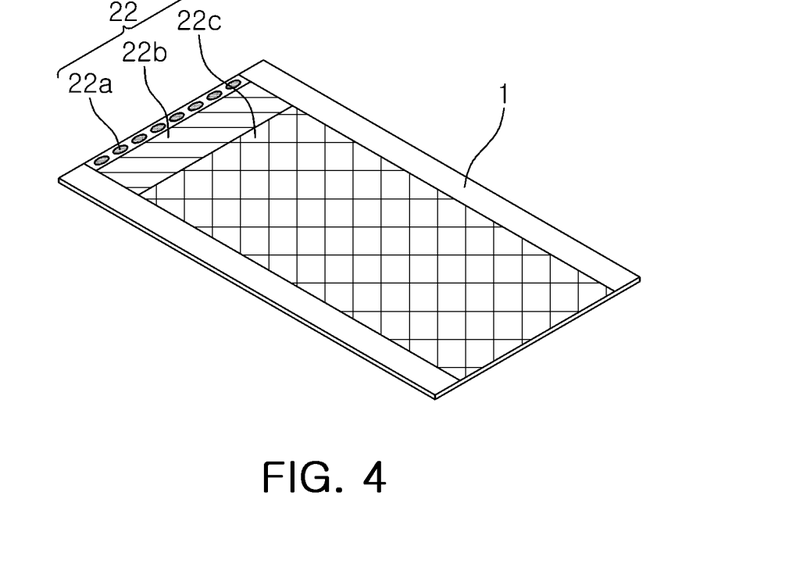
FIG. 4 is a perspective view showing a dielectric layer and a second internal electrode of FIG. 3.

FIG. 4 is a perspective view showing a dielectric layer and a second internal electrode of FIG. 3.

Figure 5:
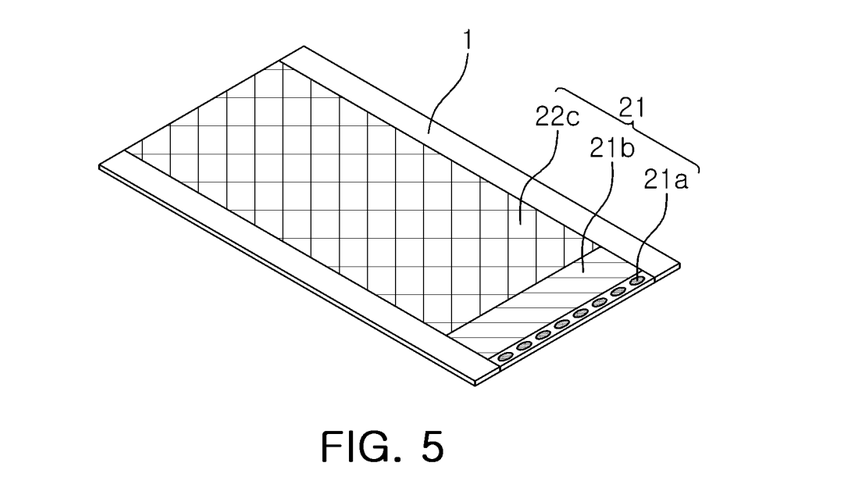
FIG. 5 is a perspective view showing the dielectric layer and a first internal electrode of FIG. 3.

FIG. 5 is a perspective view showing the dielectric layer and a first internal electrode of FIG. 3.

Figure 6:
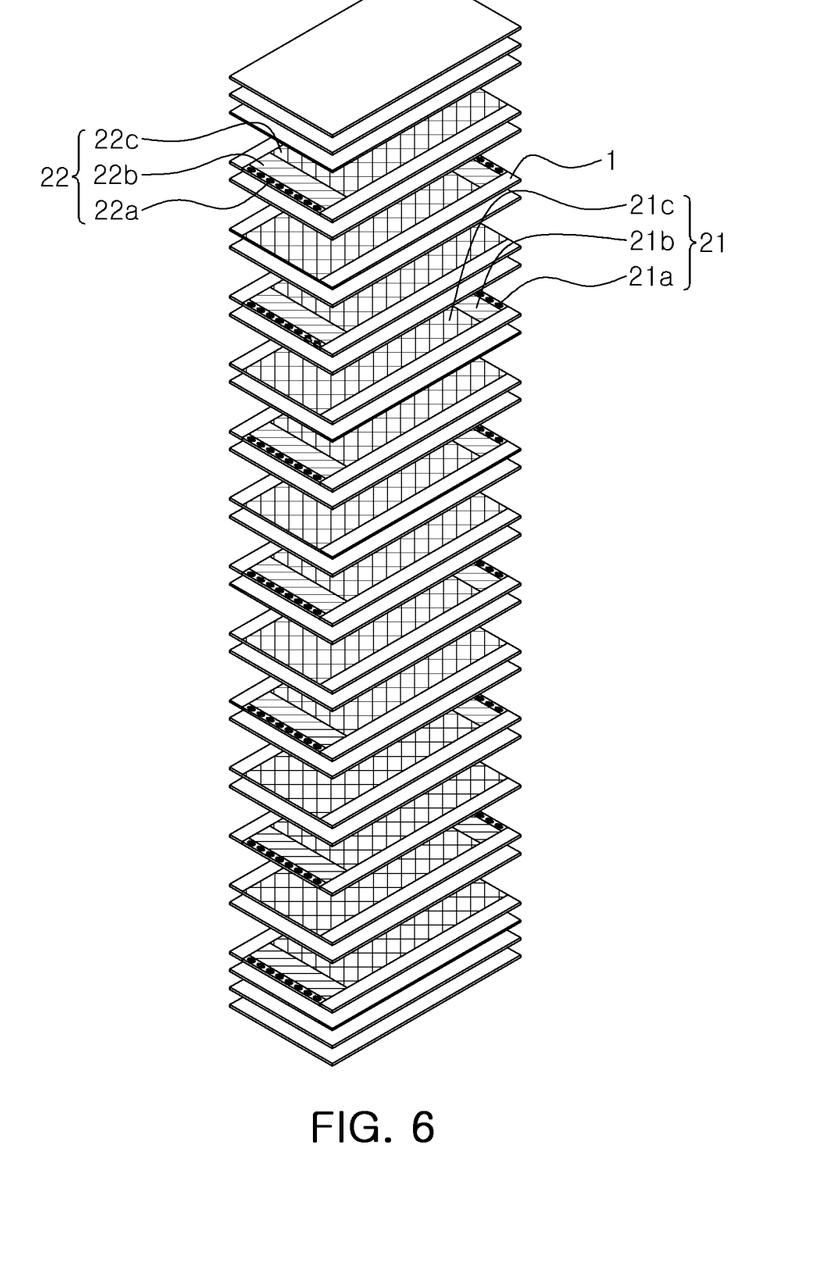
FIG. 6 is an exploded perspective view showing dielectric layers and first and second internal electrodes in the multilayer ceramic capacitor of FIG. 1.

FIG. 6 is an exploded perspective view showing dielectric layers and first and second internal electrodes in the multilayer ceramic capacitor of FIG. 1.

Referring to FIGS. 1 through 6, a multilayer ceramic electronic component according to the embodiment of the present invention may include a ceramic body 10 including a dielectric layer 1; first and second internal electrodes 21 and 22 disposed in the ceramic body 10 to face each other, having the dielectric layer 1 interposed therebetween; and first and second external electrodes 31 and 32 formed on external surfaces of the ceramic body 10 and electrically connected to the first and second internal electrodes 21 and 22, wherein the first and second internal electrodes 21 and 22 are exposed to both end surfaces of the ceramic body 10, the first internal electrode 21 may include a first oxide layer 21a formed inwardly from one end surface of the ceramic body in a length direction and a first interlayer 21b formed adjacently to the first oxide layer 21a and containing a metal having an ionization tendency higher than that of a metal contained in the first internal electrode 21 or containing a metal more easily oxidized than the metal contained in the first internal electrode 21 in a solid solution form, as well as the metal contained in the first internal electrode 21, and the second internal electrode 22 may include a second oxide layer 22a formed inwardly from the other end surface of the ceramic body 10 in the length direction and a second interlayer 22b formed adjacently to the second oxide layer 22a and containing a metal having an ionization tendency higher than that of a metal contained in the second internal electrode 22 or containing a metal more easily oxidized than the metal contained in the second internal electrode 22 in a solid solution form, as well as the metal contained in the second internal electrode 22.

Hereinafter, the multilayer ceramic electronic component according to the embodiment of the present invention will be described. In particular, a multilayer ceramic capacitor will be described, but the present invention is not limited thereto.

The ceramic body 10 is not particularly limited, but may have, for example, a rectangular parallelepiped shape.

In addition, the ceramic body 10 may have first and second main surfaces facing each other, and first and second side surfaces and first and second end surfaces that connect the first and second main surfaces to each other.

Meanwhile, in the multilayer ceramic capacitor according to the embodiment of the present invention, the 'length direction' refers to an 'L' direction of FIG. 1, a 'width direction' refers to a 'W' direction of FIG. 1, and a 'thickness direction' refers to a 'T' direction of FIG. 1. Here, the 'thickness direction' is the same as a direction in which dielectric layers are stacked, that is, a 'stacked direction'.

The multilayer ceramic capacitor according to the embodiment of the present invention may include the ceramic body 10 including the dielectric layer 1; the first and second internal electrodes 21 and 22 disposed in the ceramic body 10 to face each other, having the dielectric layer 1 interposed therebetween; and the first and second external electrodes 31 and 32 formed on external surfaces of the ceramic body 10 and electrically connected to the first and second internal electrodes 21 and 22.

The first and second internal electrodes 21 and 22 are not particularly limited, but may be formed using a conductive paste made of at least one of, for example, a noble metal material such as palladium (Pd), a palladium-silver (Pd—Ag) alloy, or the like, nickel (Ni), and copper (Cu).

In order to form capacitance, the first and second external electrodes 31 and 32 may be formed on the external surfaces of the ceramic body 10 and electrically connected to the first and second internal electrodes 21 and 22.

The first and second external electrodes 31 and 32 may be formed of the same conductive material as that of the internal electrodes but are not limited thereto. For example, the first and second external electrodes 31 and 32 may be formed of copper (Cu), silver (Ag), nickel (Ni), or the like.

The first and second external electrodes 31 and 32 may be formed by applying a conductive paste prepared by adding glass frits to a metal powder and then sintering the applied conductive paste.

According to the embodiment of the present invention, the first and second internal electrodes 21 and 22 are exposed to both end surfaces of the ceramic body 10, the first internal electrode 21 may include the first oxide layer 21a formed inwardly from one end surface of the ceramic body 10 in the length direction and the first interlayer 21b formed adjacently to the first oxide layer 21a and containing a metal having an ionization tendency higher than that of a metal contained in the first internal electrode 21 or containing a metal more easily oxidized than the metal contained in the first internal electrode 21 in a solid solution form, as well as the metal contained in the first internal electrode 21, and the second internal electrode 22 may include the second oxide layer 22a formed inwardly from the other end surface of the ceramic body 10 in the length direction and the second interlayer 22b formed adjacently to the second oxide layer 22a and containing a metal having an ionization tendency higher than that of a metal contained in the second internal electrode 22 or containing a metal more easily oxidized than the metal contained in the second internal electrode 22 in a solid solution form, as well as the metal contained in the second internal electrode 22.

Generally, in accordance with implementing high capacitance in the multilayer ceramic capacitor, the number of stacked layers has increased.

Meanwhile, in the internal electrodes of the multilayer ceramic capacitor, margin parts provided in the length direction, a non-overlapped area, is formed in order to prevent short-circuits, and the respective internal electrodes are stacked in opposite directions to each other such that the margin parts in the length direction are not overlapped with each other.

In this case, a portion forming capacitance of the multilayer ceramic capacitor is a region in which the internal electrodes are overlapped with each other, and the margin part in the length direction may be a portion that does not contribute to capacitance formation.

As describe above, the margin part in the length direction do not contribute to capacitance formation and form a step portion to thereby induce crack generation, causing degradation in reliability of the multilayer ceramic capacitor.

According to the embodiment of the present invention, since the first and second internal electrodes 21 and 22 are exposed to both end surfaces of the ceramic body 10 in order to solve this defect, the margin part in the length direction, the region in which the first and second internal electrodes are not overlapped with each other as described above, may not be formed.

As described above, since the margin part in the length direction is not formed, formation of a step portion may be suppressed, such that crack generation may be decreased, thereby realizing a multilayer ceramic capacitor having excellent reliability.

In addition, as described above, although the first and second internal electrodes 21 and 22 are exposed to both end surfaces of the ceramic body 10, since the first internal electrode 21 includes the first oxide layer 21a formed inwardly from one end surface of the ceramic body 10 in the length direction and the second internal electrode 22 includes the second oxide layer 22a formed inwardly from the other end surface of the ceramic body 10 in the length direction, a short-circuit defect may not be generated.

Meanwhile, since the first internal electrode 21 includes the first interlayer 21b formed adjacently to the first oxide layer 21a and containing a metal having an ionization tendency higher than that of a metal contained in the first internal electrode 21 or containing a metal more easily oxidized than the metal contained in the first internal electrode 21 in a solid solution form, as well as the metal contained in the first internal electrode 21, and the second internal electrode 22 includes the second interlayer 22b formed adjacently to the second oxide layer 22a and containing a metal having an ionization tendency higher than that of a metal contained in the second internal electrode 22 or containing a metal more easily oxidized than the metal contained in the second internal electrode 22 in a solid solution form, as well as the metal contained in the second internal electrode 22, a high capacitance multilayer ceramic capacitor may be implemented.

More specifically, since the first and second interlayers 21b and 22b may contain the metal contained in the first and second internal electrodes 21 and 22 and further contain the metal having an ionization tendency higher than that of the metal contained in the first and second internal electrodes 21 and 22 or further contain the metal more easily oxidized than the metal contained in the internal electrodes, in a solid solution form, respectively, and may form a region in which they are overlapped with each other, capacitance may be formed in the multilayer ceramic capacitor.

That is, since the multilayer ceramic capacitor may have an overlapped region having a wider area than that of an overlapped region between internal electrodes forming capacitance of a general multilayer ceramic capacitor due to the first and second interlayers 21b and 22b, a high capacitance multilayer ceramic capacitor may be implemented.

Hereinafter, the first and second oxide layers 21a and 22a and the first and second interlayers 21b and 22b will be described in more detail.

The first and second oxide layers 21a and 22a, layers formed by oxidizing the first and second interlayers 21b and 22b, respectively, may be formed by oxidizing portions of the first and second interlayers 21b and 22b during a sintering or re-oxidizing process of the ceramic body 10.

Since the first and second interlayers 21b and 22b may contain the metal having an ionization tendency higher than that of the metal contained in the first and second internal electrodes 21 and 22 or contain the metal more easily oxidized than the metal contained in the internal electrodes, in a solid solution form, respectively, as well as the metal contained in the first and second internal electrodes 21 and 22, the first and second interlayers 21b and 22b may be easily oxidized during the sintering or re-oxidizing process.

In addition, in a cross-section of the ceramic body in a length-thickness direction, a width La of the first and second oxide layers 21a and 22a may be appropriately adjusted using an atmosphere or temperature at the time of the sintering or re-oxidizing process.

A detailed description of the feature will be provided in a manufacturing method of a multilayer ceramic electronic component according to an embodiment of the present invention to be described below.

The width La of at least one of the first and second oxide layers 21a and 22a may be 5 to 30 μm, inwardly from at least one of both end surfaces of the ceramic body 10 in the length direction, but is not limited thereto.

As a specific example, the first oxide layer 21a may have a width of 5 to 30 μm inwardly from one end surface of the ceramic body 10 on which the second external electrode 32 is formed in the length direction, and the second oxide layer 22a may have a width of 5 to 30 μm inwardly from the other end surface of the ceramic body 10 on which the first external electrode 31 is formed in the length direction.

Due to the first and second oxide layers 21a and 22a, the short-circuit defect may not be generated as described above, and crack defects caused by the step portion may be decreased, such that a multilayer ceramic capacitor having excellent reliability may be implemented.

In the case in which the width La of at least one of the first and second oxide layers 21a and 22a is smaller than 5 μm, the short-circuit may be generated, such that the reliability of the multilayer ceramic capacitor may be deteriorated.

Meanwhile, in the case in which the width La of at least one of the first and second oxide layers 21a and 22a is greater than 30 μm, volume expansion due to an oxidation of the internal electrodes may be excessive, such that a crack generation rate may increase, and a short-circuit generation rate may also increase.

According to the embodiment of the present invention, a width Lb from at least one of both end surfaces of the ceramic body 10 to at least one of the first and second interlayers 21b and 22b may be equal to or greater than the width La of at least one of the first and second oxide layers 21a and 22a and may be 5 μm or more.

The width Lb from at least one of both end surfaces of the ceramic body 10 to at least one of the first and second interlayers 21b and 22b may be equal to or greater than the width La of at least one of the first and second oxide layers 21a and 22a and may be adjusted to satisfy a width of 5 μm or more, in order to prevent the generation of cracks or short-circuit defects.

That is, in the case in which the width Lb from at least one of both end surfaces of the ceramic body 10 to at least one of the first and second interlayers 21b and 22b is shorter than the width La of at least one of the first and second oxide layers 21a and 22a or less than 5 μm, crack or short-circuit defects may be generated.

Further, a difference Lc (Lc=L-Lb) between a length L of the ceramic body 10 and the width Lb from at least one of both end surfaces of the ceramic body 10 to at least one of the first and second interlayers 21b and 22b may be 5 μm or more, but is not limited thereto.

The difference Lc (Lc=L-Lb) between the length L of the ceramic body 10 and the width Lb from at least one of both end surfaces of the ceramic body 10 to at least one of the first and second interlayers 21b and 22b may refer to a length of one of regions 21c and 22c of the first and second internal electrodes 21 and 22 except for the first and second oxide layers 21a and 22a and the first and second interlayers 21b and 22b.

As described above, the difference Lc (Lc=L-Lb) between the length L of the ceramic body 10 and the width Lb from at least one of both end surfaces of the ceramic body 10 to at least one of the first and second interlayers 21b and 22b is adjusted to be 5 μm or more, such that capacitance adjacent to the desired capacitance may be obtained.

That is, in the case in which the difference Lc (Lc=L-Lb) between the length L of the ceramic body 10 and the width Lb from at least one of both end surfaces of the ceramic body 10 to at least one of the first and second interlayers 21b and 22b is smaller than 5 μm, the desired capacitance may not be obtained.

The first and second interlayers 21b and 22b may contain at least one selected from a group consisting of chromium (Cr), tungsten (W), molybdenum (Mo), magnesium (Mg), manganese (Mn), copper (Cu), and nickel (Ni), but is not limited thereto.

That is, as described above, the first and second interlayers 21b and 22b may contain the metal having an ionization tendency higher than that of the metal contained in the first and second internal electrodes 21 and 22 or contain the metal more easily oxidized than the metal contained in the internal electrodes in a solid solution form, respectively, as well as the metal contained in the first and second internal electrodes 21 and 22.

As an example, the metal contained in the first and second internal electrodes 21 and 22 may be nickel (Ni), and the first and second interlayers 21b and 22b may contain a metal having an ionization tendency higher than that of the nickel (Ni), in addition to the metal contained in the first and second internal electrodes 21 and 22, without a particular limitation.

A manufacturing method of a multilayer ceramic electronic component according to another embodiment of the present invention may include: preparing a ceramic green sheet using a slurry containing a ceramic powder; forming first and second internal electrode patterns on the ceramic green sheet using a first conductive metal paste; forming third and fourth internal electrode patterns to be adjacent to the first and second internal electrode patterns, respectively, using a second conductive metal paste containing a metal having an ionization tendency higher than that of a conductive metal of the first conductive metal paste or containing a metal more easily oxidized than the metal contained in the first conductive metal paste in a solid solution form, as well as the metal contained in the first conductive metal paste; stacking and cutting a plurality of layers of the ceramic green sheet to form a ceramic body including a dielectric layer and first and second internal electrodes disposed to face each other, having the dielectric layer interposed therebetween, the first internal electrode being formed such that the third internal electrode pattern is exposed to one end surface and the second internal electrode being formed such that the fourth internal electrode pattern is exposed to the other end surface; sintering the ceramic body to oxidize portions of the third and fourth internal electrode patterns; and forming first and second external electrodes on external surfaces of the ceramic body to be electrically connected to the first and second external electrodes, wherein the first and second internal electrodes are exposed to both end surfaces of the ceramic body, the first internal electrode may include a first oxide layer formed inwardly from one end surface of the ceramic body in a length direction and a first interlayer formed adjacently to the first oxide layer and containing a metal having an ionization tendency higher than that of the metal contained in the first internal electrode or containing a metal more easily oxidized than the metal contained in the first internal electrode in a solid solution form, as well as the metal contained in the first internal electrode, and the second internal electrode may include a second oxide layer formed inwardly from the other end surface of the ceramic body in the length direction and a second interlayer formed adjacently to the second oxide layer and containing a metal having an ionization tendency higher than that of the metal contained in the second internal electrode or containing a metal more easily oxidized than the metal contained in the second internal electrode in a solid solution form, as well as the metal contained in the second internal electrode.

In addition, the manufacturing method of a multilayer ceramic electronic component according to the embodiment of the present invention may further include forming first and second side margin parts on both side surfaces of the ceramic body, wherein the first and second side margin parts contain a ceramic slurry and the first and second internal electrodes are exposed to the both side surfaces of the ceramic body.

In this case, a width between the first and second internal electrodes and the side surfaces of the ceramic body may be 18 μm or less.

Hereinafter, the manufacturing method of a multilayer ceramic electronic component according to an embodiment of the present invention will be described in detail, but a description overlapped with the description of the features of the multilayer ceramic electronic component according to the present invention described above will be omitted.

First, the ceramic green sheet may be prepared using the slurry containing the ceramic powder.

The forming of the ceramic green sheet is not particularly limited and may be performed by using a general method therefor.

Next, the first and second internal electrode patterns may be formed on the ceramic green sheet using the first conductive metal paste.

As the first conductive metal paste, a conductive metal paste generally used to form an internal electrode pattern may be used, but is not particularly limited.

Therefore, the first conductive metal paste may contain at least one selected from a group consisting of nickel (Ni), copper (Cu), palladium (Pd), and a palladium-silver (Pd—Ag) alloy.

A method of forming the first and second internal electrode patterns on the ceramic green sheet is not particularly limited, but, for example, may be performed by dispensing the first conductive metal paste onto the ceramic green sheet while moving a squeegee in one direction.

According to an embodiment of the present invention, the third and fourth internal electrode patterns are formed to be adjacent to the first and second internal electrode patterns, respectively, using the second conductive metal paste containing a metal having an ionization tendency higher than that of the conductive metal of the first conductive metal paste or containing the metal more easily oxidized than the metal contained in the first conductive metal paste in a solid solution form, as well as the metal contained in the first conductive metal paste.

The metal having an ionization tendency higher than that of the conductive metal of the first conductive metal paste may be at least one selected from a group consisting of chromium (Cr), tungsten (W), molybdenum (Mo), magnesium (Mg), manganese (Mn), copper (Cu), and nickel (Ni), but is not limited thereto.

Then, a plurality of layers of the ceramic green sheet may be stacked and cut to form the ceramic body including the dielectric layer and the first and second internal electrodes disposed to face each other, having the dielectric layer interposed therebetween, the first internal electrode being formed such that the third internal electrode pattern is exposed to one end surface, and the second internal electrode being formed such that the fourth internal electrode pattern is exposed to the other end surface.

According to an embodiment of the present invention, the first and second internal electrodes are formed such that the third internal electrode pattern is exposed to one end surface and the fourth internal electrode pattern is exposed to the other end surface, whereby the first and second internal electrodes may be exposed to both end surfaces of the ceramic body.

Generally, the first and second internal electrodes are formed to be alternately exposed to respective end surfaces of the ceramic body, in order to prevent short-circuits.

As described above, since the first internal electrode is only exposed to one end surface and the second internal electrode is only exposed to the other end surface, a short-circuit defect may be prevented, but as the number of stacked layers increases, a step portion is formed, such that a crack defect may be generated.

However, according to an embodiment of the present invention, since the first and second internal electrodes may be exposed to both end surfaces of the ceramic body, crack generation may be suppressed, thereby decreasing crack defects.

However, the short-circuit defects generated due to the first and second internal electrodes being exposed to both end surfaces of the ceramic body may be solved by oxidizing portions of the third and fourth internal electrode patterns and insulating the patterns from each other so as to expose the first internal electrode only to one end surface and expose the second internal electrode only to the other end surface, as described below.

Next, the ceramic body may be fired to oxidize the portions of the third and fourth internal electrode patterns, such that the first and second oxide layers may be formed.

The first oxide layer may be formed by oxidizing a portion of the third internal electrode pattern included in the first internal electrode, and the second oxide layer may be formed by oxidizing a portion of the fourth internal electrode pattern included in the second internal electrode.

The width La of at least one of the first and second oxide layers may be 5 to 30 μm inwardly from at least one of both end surfaces of the ceramic body in the length direction, such that portions f the internal electrodes may be insulated in order to alternately expose the first and second internal electrodes to the respective end surfaces.

A method of adjusting the width La of the first and second oxide layers is not particularly limited, and the width La may be appropriately adjusted using an atmosphere or temperature at the time of the sintering process or an re-oxidizing process that may be additionally performed.

Thereafter, the first and second external electrodes may be formed on the external surfaces of the ceramic body to be electrically connected to the first and second internal electrodes, and a plating layer may be formed on the first and second external electrodes, thereby manufacturing the multilayer ceramic capacitor.

According to the manufacturing method as described above, electrode portions formed by sintering the first and second internal electrode patterns formed using the first conductive metal paste, the first and second interlayers formed by sintering the third and fourth internal electrode patterns formed using the second conductive metal paste containing the metal having an ionization tendency higher than that of the conductive metal of the first conductive metal paste as well as the conductive metal of the first conductive metal paste, and the first and second oxide layers formed by oxidizing portions of the third and fourth internal electrode patterns may be adjacent to one another in the length direction of the ceramic body.

Therefore, since the formation of the step portion caused by stacking a plurality of layers of the ceramic green sheet including the internal electrode patterns formed thereon may be suppressed, the generation of cracks due to the step portion formation may be decreased, such that reliability may be excellent, and the overlapped region between the first and second internal electrodes, which form capacitance, may be enlarged, such that a high capacitance multilayer ceramic capacitor may be implemented.

Hereafter, although the present invention will be described in detail with reference to Inventive Examples, the present invention is not limited thereto.

The present Inventive Examples were performed in order to test whether or not cracks or short-circuits were generated and whether or not capacitance was implemented according to the width of the oxide layer and the difference between the length of the ceramic body and the width from an end surface of the ceramic body to the interlayer, with respect to multilayer ceramic capacitors to which a dielectric layer 1 having an average thickness of 0.6 μm or less is applied.

The multilayered ceramic capacitor according to an Inventive Example was manufactured as follows.

First, a slurry containing a powder such as barium titanate ($BaTiO_3$), or the like, and having an average particle size of 0.1 μm was applied to and dried on a carrier film to prepare a plurality of ceramic green sheets having thicknesses of 1.05 μm and 0.95 μm.

Next, a first conductive metal paste was prepared using 50 wt % of a nickel powder, an organic binder, a dispersant, an organic solvent, and the like.

After the first conductive metal paste was applied to the ceramic green sheets by a screen printing method, the second conductive metal paste obtained by adding chromium (Cr) having an ionization tendency higher than nickel, to the first conductive metal paste was applied onto a region adjacent to the applied first conductive paste, thereby forming internal electrodes.

400 to 500 ceramic green sheets were stacked, thereby forming a multilayer body.

Then, the multilayer body was compressed and cut to thereby form a chip having a 1005 standard size, and the chip was fired at a temperature of 1050 to 1200° C. under a reduction atmosphere in which $H_2$ is contained in an amount of 0.1% or less.

Next, a process of forming external electrodes, a plating process, and the like, were performed to manufacture the multilayer ceramic capacitors.

In Comparative Examples, multilayer ceramic capacitors were manufactured by the same method as that in Inventive Examples except that the width of the oxide layer and the difference between the length of the ceramic body and the width from the end surface of the ceramic body to the interlayer was outside of the numerical ranges of the present invention.

The following table 1 shows results obtained by comparing whether or not cracks were generated and whether or not short-circuits were generated according to the width La of the oxide layer.

The case in which a crack generation rate was 5% or more was determined to be defective (x), and the case in which the crack generation rate was less than 5% was determined to be good (O). Further, the case in which a short-circuit generation rate was 20% or more was determined to be defective (x), and the case in which the short-circuit generation rate was less than 20% was determined to be good (O)

TABLE 1

| Sample | Width (La) of oxide layer (μm) | Determination of crack defects | Determination of short-circuit defects |
|---|---|---|---|
| 1* | 1 | o | x |
| 2* | 3 | o | x |
| 3 | 5 | o | o |
| 4 | 10 | o | o |
| 5 | 15 | o | o |
| 6 | 20 | o | o |
| 7 | 30 | o | o |
| 8* | 40 | x | x |
| 9* | 50 | x | x |

*Comparative Example

Referring to FIG. 1, it may be appreciated that in samples 1 and 2 in which a width of an oxide layer was less than 5 μm, the short-circuit defect was generated, to cause a defect in reliability, and in samples 8 and 9 in which a width of an oxide layer is more than 30 μm, the crack defect and short-circuit defect were generated, to cause a defect in reliability.

However, it may be appreciated that in samples 3 to 7, which were Inventive Examples satisfying the numerical ranges of the present invention, the crack defect and the short-circuit defect were decreased, such that the reliability was excellent.

The following Table 2 shows results obtained by comparing whether or not the capacitance was implemented according to the difference (Lc=L−Lb) between the length of the ceramic body and the width from the end surface of the ceramic body to the interlayer.

In the following Table 2, the case in which a ratio of actual capacitance to the desired capacitance was less than 90% was determined to be defective (x), and the case in which the ratio was 90% or more was determined to be good (o). Further, the case in which a standard deviation value of the capacitance was more than 0.2 was determined to be defective (x), and the case in which the standard deviation value of the capacitance was 0.2 or less was determined to be good (o).

TABLE 2

| Sample | Difference (Lc = L − Lb) between length of ceramic body and width from end surface of ceramic body to interlayer (μm) | Determination of actual capacitance based on desired capacitance | Determination of standard deviation of capacitance |
|---|---|---|---|
| 10 | 1000 | o | o |
| 11 | 500 | o | o |
| 12 | 200 | o | o |
| 13 | 100 | o | o |
| 14 | 50 | o | o |
| 15 | 30 | o | o |
| 16 | 10 | o | o |
| 17 | 5 | o | o |
| 18* | 3 | x | x |

*Comparative Example

Referring to Table 2, it may be appreciated that in sample 18 in which a difference (Lc=L−Lb) between a length of a ceramic body and a width from an end surface of the ceramic body to an interlayer was less than 5, a ratio of actual capacitance to desired capacitance was less than 90%, and a standard deviation value of the capacitance was more than 0.2, such that there was a limitation in implementing a high capacitance multilayer ceramic capacitor.

However, it may be appreciated that in samples 10 to 17, which were Inventive Examples satisfying the numerical ranges of the present invention, a ratio of actual capacitance to desired capacitance was 90% or more and a standard deviation value of the capacitance was 0.2 or less, such that a high capacitance multilayer ceramic capacitor may be implemented.

Therefore, it may be appreciated that in the multilayer ceramic capacitor according to the embodiment of the present invention, a high degree of capacitance was implemented, and crack defects and short-circuit defects were decreased, such that reliability was excellent.

As set forth above, according to embodiments of the present invention, a high capacitance multilayer ceramic capacitor having excellent reliability can be implemented through suppression of the formation of a step portion to decrease crack generation and increasing an overlapped area to secure maximum capacitance.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including a dielectric layer;
first and second internal electrodes disposed in the ceramic body to face each other, having the dielectric layer interposed therebetween; and
first and second external electrodes formed on external surfaces of the ceramic body and electrically connected to the first and second internal electrodes,
wherein the first and second internal electrodes are exposed to both end surfaces of the ceramic body, the first internal electrode includes a first oxide layer formed inwardly from one end surface of the ceramic body in a length direction and a first interlayer formed adjacently to the first oxide layer, and the second internal electrode includes a second oxide layer formed inwardly from the other end surface of the ceramic body in the length direction and a second interlayer formed adjacently to the second oxide layer, and
the first interlayer contains a metal having an ionization tendency higher than that of a metal contained in a remaining region of the first internal electrode, or contains a metal more easily oxidized than the metal contained in the remaining region of the first internal electrode, in a solid solution form, as well as the metal contained in the remaining region of the first internal electrode, and the second interlayer contains a metal having an ionization tendency higher than that of a metal contained in a remaining region of the second internal electrode or contains a metal more easily oxidized than the metal contained in the remaining region of the second internal electrode, in a solid solution form, as well as the metal contained in the remaining region of the second internal electrode.

2. The multilayer ceramic electronic component of claim 1, wherein a width La of at least one of the first and second oxide layers is 5 to 30 μm inwardly from at least one of the both end surfaces of the ceramic body in the length direction.

3. The multilayer ceramic electronic component of claim 1, wherein a width Lb from at least one of the both end surfaces of the ceramic body to at least one of the first and second interlayers is equal to or greater than a width La of at least one of the first and second oxide layers and is 5 μm or more.

4. The multilayer ceramic electronic component of claim 1, wherein when Lc is defined as a difference (Lc=L−Lb) between a length L of the ceramic body and a width Lb from at least one of the both end surfaces of the ceramic body to at least one of the first and second interlayers, Lc is 5 μm or more.

5. The multilayer ceramic electronic component of claim 1, wherein the first and second interlayers contain at least one selected from a group consisting of chromium (Cr), tungsten (W), molybdenum (Mo), magnesium (Mg), manganese (Mn), copper (Cu), and nickel (Ni).

6. The multilayer ceramic electronic component of claim 1, wherein the first and second internal electrodes contain at least one selected from a group consisting of nickel (Ni), copper (Cu), palladium (Pd), and a palladium-silver (Pd-Ag) alloy.

* * * * *